United States Patent [19]

Morse

[11] Patent Number: 4,729,447

[45] Date of Patent: Mar. 8, 1988

[54] SAFEGUARD FOR POWERED WHEELCHAIR

[76] Inventor: John F. Morse, 1699 Hines Hill Rd., Hudson, Ohio 44236

[21] Appl. No.: 907,851

[22] Filed: Sep. 15, 1986

[51] Int. Cl.⁴ .............................................. B62D 61/08
[52] U.S. Cl. ..................................... 180/65.1; 74/566; 180/214; 180/315; 180/907
[58] Field of Search ............... 180/907, 315, 65.1, 180/216, 214; 280/289 H, 289 G, 750, 751; 74/566, 551.8, 563

[56] References Cited

U.S. PATENT DOCUMENTS

| | | | |
|---|---|---|---|
| 2,321,528 | 6/1943 | Sherer | 74/566 |
| 2,634,625 | 4/1953 | Mahardy | 74/566 |
| 4,570,739 | 2/1986 | Kramer | 180/907 |

FOREIGN PATENT DOCUMENTS 2132954 7/1984 United Kingdom ................ 180/907

OTHER PUBLICATIONS

"The 2000 FS Deluxe Three Wheeled Powered Chair" Fortress Scientific Company.

*Primary Examiner*—David M. Mitchell
*Attorney, Agent, or Firm*—Renner, Kenner, Greive Bobak & Taylor

[57] ABSTRACT

A safeguard for an electric powered wheelchair having a forward steering column (13) on which a handle bar (14) and a control lever (20) are mounted, said safeguard comprising a platform (25) underlying said lever (20) and extending rearwardly thereof to provide contact with the body of an occupant of the chair when rising to dismount therefrom.

6 Claims, 6 Drawing Figures

SAFEGUARD FOR POWERED WHEELCHAIR

TECHNICAL FIELD

This invention relates generally to control assemblies for electric powered wheelchairs, and more particularly to safeguard control assemblies for wheelchairs having hand control levers forward of the chair seat.

BACKGROUND OF THE INVENTION

A three-wheeled electric powered chair in public use in the United States is manufactured by Fortress Scientific of Hayes Road, Southall, Middlesex, England UB2 5LZ. This chair has steering handle bars forward of the chair seat and forward and reverse control lever arms mounted behind the handle bars for actuation by the thumbs of the occupant having his hands on the bars.

When both the thumb lever arms are released they automatically return to power-off or neutral position, automatically stopping the vehicle by means of electric dynamic braking of the drive, but the electric battery power is still connected through a main key switch in readiness for the next operation. Accordingly, if the occupant rises to dismount without turning off the main switch he is quite likely to accidentally bump one of the thumb lever arms causing the chair to lurch forward or reverse and resulting in serious injury to the occupant by throwing him to the floor or ground.

The precaution of turning off the main switch is easily forgotten or overlooked if the occupant rises in haste to answer the telephone or doorbell, for example.

DISCLOSURE OF THE INVENTION

The present invention provides a fail-safe guard against the accidental actuation of the control lever by the occupant of a wheelchair when rising to dismount even though the main key switch has not been turned off.

It is an object of the present invention to provide a novel and improved control assembly for an electric powered wheelchair having a fail-safe guard preventing accidental actuation of the control lever by body contact of the occupant when rising to dismount.

Another object is to provide a novel and improved control assembly which is simple, compact and inexpensive.

A further object is to provide a novel and improved fail-safe guard which functions as a guide for the entrance of the wheelchair occupant's thumbs into acutating position behind the control levers.

These and other objects are accomplished by the improvements comprising the present invention, a preferred embodiment of which is disclosed herein as illustrating the best known mode of carrying out the invention. Various changes in details of construction and modifications thereof are comprehended within the scope of the appended claims.

PREFERRED MODE FOR CARRYING OUT THE INVENTION

Figure 1:
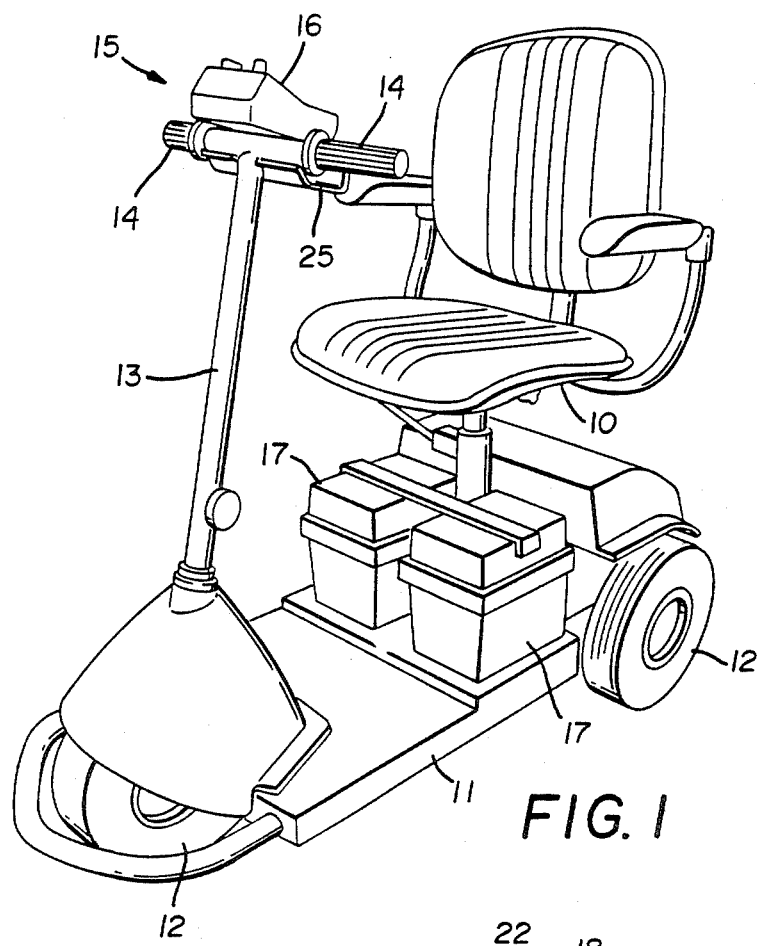
FIG. 1 is a perspective view of a three-wheeled electric power chair embodying the invention.
Figure 2:
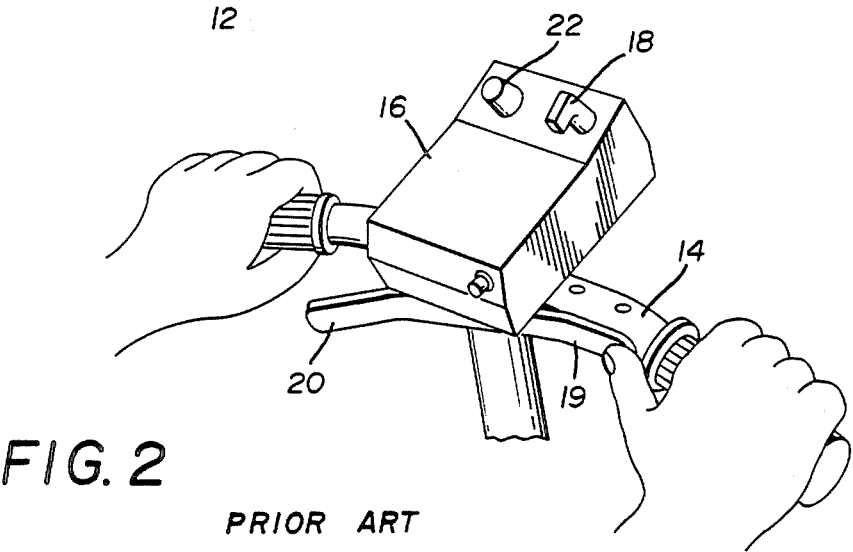
FIG. 2 is an enlarged partial perspective view showing the control assembly of a prior art electric powered chair.

Referring to FIGS. 1 and 4–6, the electric powered chair includes a seat 10 and a floor board 11 supported on three wheels 12. A forward steering column 13 is operatively connected to the front wheel and actuated by handle bars 14. The control assembly indicated generally at 15 embodies an electric switch box 16 mounted on top of the steering column 13, and it is connected to the batteries 17 through a main switch 18. The control assembly 15 includes a control lever having two arms 19 and 20 pivoted at 21 in the underside of the switch box 16 and electrically connected in the switch box to the rotatable speed control button 22. The prior art control assembly shown in FIGS. 2 and 3 embodies the same above-described elements as shown in FIGS. 2 and 3.

Figure 5:
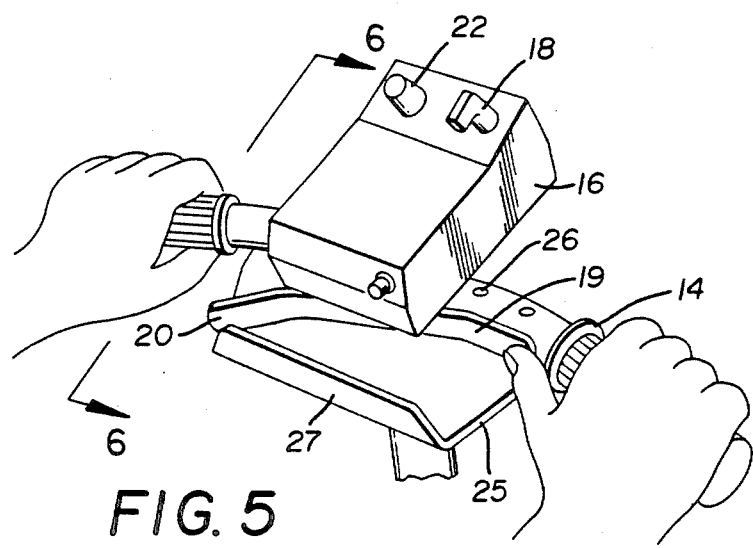
FIG. 5 is a perspective view similar to FIG. 2 showing the control assembly of the present invention.

In the normal operation of the chair with the occupant seated, the main switch is turned on and the occupant turns the speed control button 22 to indicate the speed desired. The occupant then places his hands on the handle bars with his thumbs behind the control lever arms 19 and 20. If he desires to proceed forward he presses the right hand lever arm 19 forwardly as shown in FIG. 5, and if he desires to move rearwardly he presses the left hand lever arm forwardly. The pivot shaft 21 of lever 20 is automatically controlled within the switch box to return the lever arms to neutral or inoperative position when the pressure on both lever arms is relieved, but the pivot shaft is still electrically connected to the batteries 17 unless and until the main switch is turned off.

Figure 3:
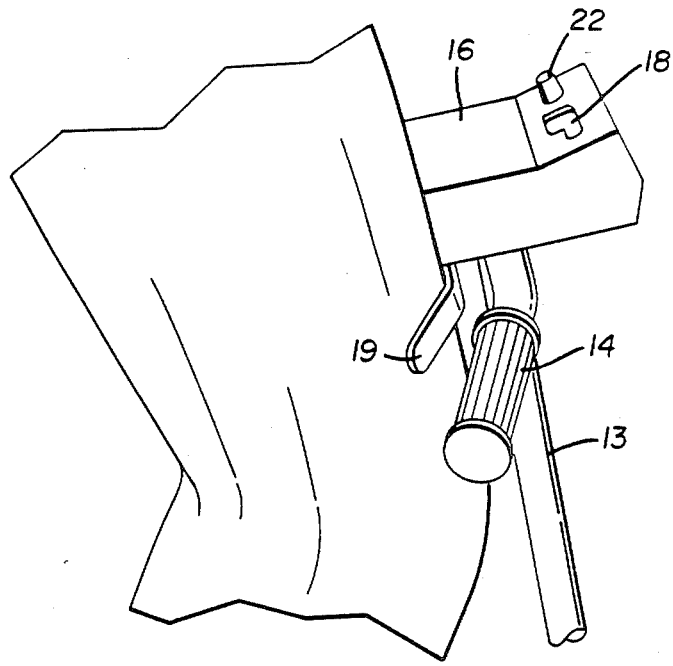
FIG. 3 is a similar view showing how the prior art control lever can be accidentally actuated by contact with the body of an occupant of the chair when rising to dismount.

Accordingly, even though the operating instructions accompanying the chair caution that the main switch should be turned off when the occupant is ready to dismount and leave the chair to avoid unintentional or accidental operation thereof, the occupant may forget to turn off the main switch before dismounting, and as he rises to dismount, his leg on the dismounting side is in a position to press against one lever arm, as shown in FIG. 3, causing the chair to lurch forward or reverse suddenly, throwing the occupant to the floor and resulting in serious injury. If the speed control button is turned to a higher speed, the seriousness of the injury is accordingly increased.

The likelihood of the occupant forgetting to turn off the main switch 18 before rising to dismount is greatly increased when the occupant hastily rises to dismount in order to answer the telephone or doorbell, or in the event of some emergency.

Figure 4:
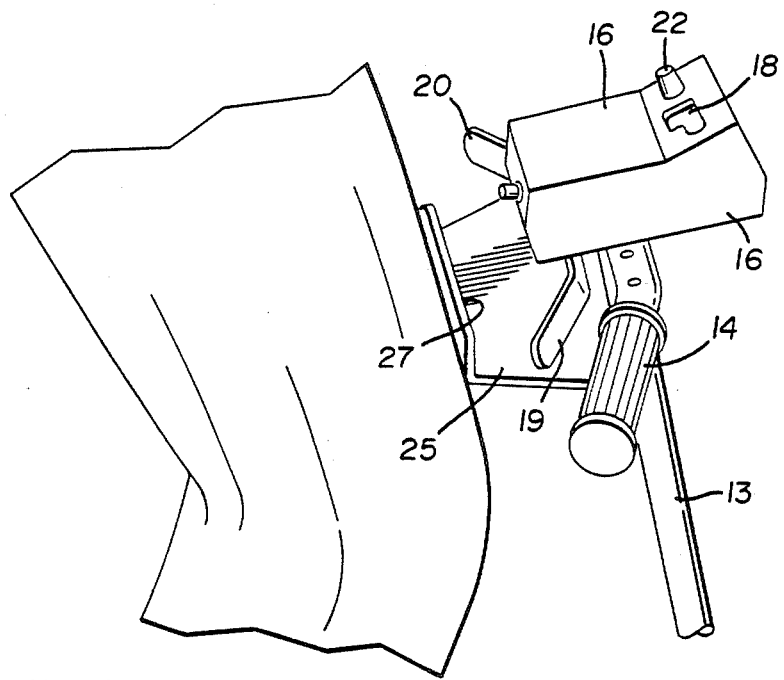
FIG. 4 is a similar view showing how the control assembly of the present invention provides a safeguard against accidental acutation of the control lever.
Figure 6:
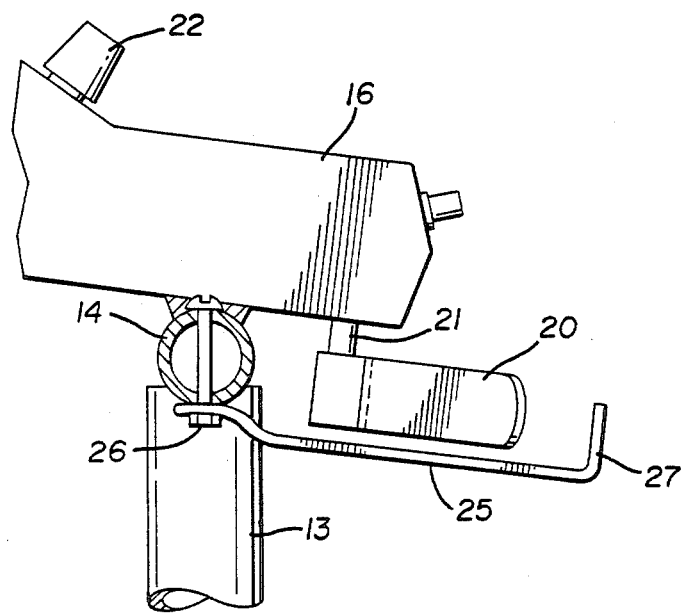
FIG. 6 is a sectional view on line 6—6 of FIG. 5.

As shown in FIGS. 4–6, the present control assembly embodies a novel safeguard to prevent the unintentional operation of the lever arms by accidental pressure of any part of the body during dismounting. A platform 25 is mounted under the lever arms by attaching its forward edge portion to the underside of the medial portion of the handle bar 14 by means of bolts 26. The main portion of the platform closely underlies the lever arms 19 and 20 and extends rearwardly beyond the lever arms in their neutral position a distance slightly greater than the thickness of an average person's thumbs. Preferably, an upturned angular flange 27 extends along the rear edge of the platform.

As shown in FIG. 4, accidental actuation of either lever arm by contact of the occupant's body when rising to dismount is prevented by the body pressing against the rear edge or flange 27 of the platform 25. Moreover, the underlying platform serves as a guide for entering the occupant's thumbs behind the lever arms, particularly if he is looking toward his path of procedure. Also, the flange 27 serves as a further guide.

The improved control assembly is simple, compact and inexpensive.

I claim:

1. In combination with an electric powered wheelchair having a steering column forward of the chair seat, a handle bar mounted on the top of said column and extending substantially crosswise of the longitudinal axis of the wheelchair, a switch box mounted at the top of the steering column, and a switch control lever pivoted on the underside of said box spaced behind said handle bar and extending substantially parallel therewith, the improvement comprising a fail-safe guard mounted on said handle bar and extending rearwardly beneath said control lever to prevent accidental contact therewith by the body of the chair occupant when rising to dismount.

2. The combination of claim 1, wherein said fail-safe guard has a rear edge flange for contact with the body of the chair occupant.

3. The combination of claim 2, wherein said rear edge flange is spaced behind said lever a distance at least equal to the thickness of an occupant's thumb when the lever is in neutral position.

4. The combination of claim 3, wherein said fail-safe guard has a platform underlying said lever to serve as a guide for the entrance of the occupant's thumbs into actuating position behind said lever.

5. The combination of claim 1, wherein said fail-safe guard comprises a platform underlying said lever to serve as a guide for the entrance of the occupant's thumbs into actuating position behind said lever.

6. The combination of claim 5, wherein the rear edge of said platform is spaced behind said lever a distance slightly greater than the thickness of an occupant's thumb when the lever is in neutral position.

* * * * *